United States Patent
Giuffrida et al.

(10) Patent No.: US 9,840,405 B2
(45) Date of Patent: Dec. 12, 2017

(54) LIQUID CONTAINER FOR BEVERAGE DISPENSERS AND BEVERAGE DISPENSER COMPRISING SAID CONTAINER

(71) Applicant: F.R.I.D.A. S.R.L., Cesena (Forli-Cesena) (IT)

(72) Inventors: Silvestro Giuffrida, Bertinoro (IT); Francesco Giuffrida, Cesena (IT)

(73) Assignee: F.R.I.D.A. S.R.L., Cesena (IT)

( * ) Notice: Subject to any disclaimer, the term of this patent is extended or adjusted under 35 U.S.C. 154(b) by 0 days.

(21) Appl. No.: 14/765,747

(22) PCT Filed: Feb. 4, 2014

(86) PCT No.: PCT/IB2014/058779
§ 371 (c)(1),
(2) Date: Aug. 4, 2015

(87) PCT Pub. No.: WO2014/122576
PCT Pub. Date: Aug. 14, 2014

(65) Prior Publication Data
US 2015/0360923 A1    Dec. 17, 2015

(30) Foreign Application Priority Data

Feb. 5, 2013  (IT) .............................. B02013A0052
Jun. 13, 2013 (IT) .............................. B02013A0297

(51) Int. Cl.
*B67D 1/00* (2006.01)
*B65D 1/02* (2006.01)
(Continued)

(52) U.S. Cl.
CPC ......... *B67D 1/0004* (2013.01); *B65D 1/0207* (2013.01); *B65D 1/0223* (2013.01);
(Continued)

(58) Field of Classification Search
CPC ....... Y10S 215/90; B67D 1/10; B67D 1/0004; B67D 1/0891; B67D 3/0029;
(Continued)

(56) References Cited

U.S. PATENT DOCUMENTS 3,939,888 A    2/1976  Scarnato
4,790,361 A *  12/1988 Jones ................... B65D 1/0292
                                                      215/12.1

(Continued)

FOREIGN PATENT DOCUMENTS

CN    101998924      3/2011
DE    2042593 A1     3/1972
(Continued)

OTHER PUBLICATIONS

Italian Search Report dated Oct. 2, 2015 from counterpart Italian App No. MI20150376.

(Continued)

*Primary Examiner* — Paul R Durand
*Assistant Examiner* — Andrew P Bainbridge
(74) *Attorney, Agent, or Firm* — Shuttleworth & Ingersoll, PLC; Timothy J. Klima

(57) ABSTRACT

A container for food safe liquids for beverage dispensers, includes a first end, or bottom wall, a second end, or neck, equipped with a portion for releasing the water designed to be connected to a corresponding junction portion of a beverage dispenser and a tubular wall extending annularly along its own main central axis between the first end and the second end. The tubular wall extends along the central axis with a succession of ridges and grooves such a way as to be collapsible along the central axis to reduce its overall dimensions, so as to compensate the negative pressure (Continued)

generated inside the container during dispensing of the liquid preventing contact between the liquid and the air outside the container.

22 Claims, 8 Drawing Sheets

(51) Int. Cl.
*B67D 1/08* (2006.01)
*B67D 1/10* (2006.01)
*B65D 8/00* (2006.01)
*B65D 1/16* (2006.01)
*B65D 1/26* (2006.01)
*B67D 3/00* (2006.01)

(52) U.S. Cl.
CPC ......... *B65D 1/0292* (2013.01); *B67D 1/0891* (2013.01); *B67D 1/10* (2013.01); *B67D 3/007* (2013.01); *B67D 3/0029* (2013.01); *B67D 3/0035* (2013.01); *B67D 3/0067* (2013.01); *B65D 1/0276* (2013.01); *B65D 1/165* (2013.01); *B65D 1/265* (2013.01); *B65D 7/045* (2013.01); *B65D 2501/0036* (2013.01); *B65D 2501/0081* (2013.01); *B67D 3/0022* (2013.01); *B67D 2210/00015* (2013.01)

(58) Field of Classification Search
CPC .... B67D 3/0035; B67D 3/0067; B67D 3/007; B65D 1/0223; B65D 2501/0081; B65D 1/40; B65D 1/0292; B65D 79/005; B65D 1/0207; B65D 2501/0036; B65D 7/045; B65D 1/16; B65D 1/165; B65D 1/265; B65D 1/0297
USPC ... 222/95, 105–107, 146.6, 185.1, 184, 215, 222/325–327; 215/381–382, 900; 220/4.04, 4.13, 666, 669
See application file for complete search history.

(56) References Cited

U.S. PATENT DOCUMENTS

| | | | | |
|---|---|---|---|---|
| 7,819,263 | B1* | 10/2010 | DiCarlo-Nelson | A61J 9/005 215/11.1 |
| 2001/0030166 | A1* | 10/2001 | Ozawa | B65D 1/0223 215/381 |
| 2004/0040972 | A1* | 3/2004 | Haj | B65D 1/0292 220/666 |
| 2005/0017015 | A1* | 1/2005 | Higuchi | B65D 1/0292 220/666 |
| 2005/0051510 | A1* | 3/2005 | Varasteh | B65D 51/1644 215/382 |
| 2006/0071029 | A1* | 4/2006 | Orita | B65D 75/56 222/185.1 |
| 2008/0093368 | A1* | 4/2008 | Muzik | B65D 1/0292 220/666 |
| 2008/0245762 | A1* | 10/2008 | Matsuoka | B65D 1/0223 215/383 |
| 2009/0114617 | A1* | 5/2009 | Inomata | B65D 1/0292 215/379 |
| 2009/0293436 | A1 | 12/2009 | Miyazaki et al. | |
| 2010/0140294 | A1* | 6/2010 | Bourguignon | B65D 83/0094 220/666 |
| 2010/0219189 | A1* | 9/2010 | Buttigieg | B65D 1/0292 220/288 |
| 2010/0314284 | A1* | 12/2010 | Truesdale | B65D 1/0292 206/579 |
| 2011/0017700 | A1* | 1/2011 | Patcheak | B65D 1/0276 215/381 |
| 2011/0036806 | A1* | 2/2011 | Gregg | B65D 1/0292 215/382 |
| 2012/0227860 | A1* | 9/2012 | Jeremiah | B65D 1/0292 141/1 |
| 2012/0248059 | A1* | 10/2012 | Saito | B65D 1/0276 215/371 |
| 2013/0026128 | A1* | 1/2013 | Beck | B65D 1/44 215/382 |
| 2013/0048593 | A1* | 2/2013 | Jung, II | B65D 23/04 215/382 |
| 2013/0048681 | A1* | 2/2013 | Walton | B67D 1/0009 222/333 |
| 2015/0129536 | A1* | 5/2015 | Moulin | B65D 1/0223 215/382 |
| 2015/0314907 | A1* | 11/2015 | Kira | B65D 1/0223 215/383 |

FOREIGN PATENT DOCUMENTS

| | | | |
|---|---|---|---|
| EP | 1574438 | A1 | 9/2005 |
| EP | 1634811 | | 3/2006 |
| EP | 1955954 | A1 | 8/2008 |
| EP | 2415705 | A1 | 2/2012 |
| FR | 2259754 | A2 | 8/1975 |
| FR | 2871447 | A1 | 12/2005 |
| GB | 1583877 | A | 2/1981 |
| GB | 2159583 | A | 12/1985 |
| GB | 2421282 | A | 6/2006 |
| JP | H10264933 | A | 10/1998 |
| JP | 2011111228 | A | 6/2011 |
| WO | 0044630 | | 8/2000 |
| WO | WO2004052732 | A1 | 6/2004 |
| WO | WO2006013715 | A1 | 2/2006 |
| WO | WO2007083266 | A2 | 7/2007 |
| WO | WO2007133297 | A2 | 11/2007 |
| WO | WO2009138863 | A2 | 11/2009 |
| WO | 2010007744 | | 1/2010 |
| WO | 2011064523 | | 6/2011 |
| WO | WO2012136915 | A1 | 10/2012 |
| WO | 2012154713 | | 11/2012 |
| WO | WO2013029342 | A1 | 3/2013 |

OTHER PUBLICATIONS

Italian Search Report dated Nov. 3, 2015 from counterpart Italian App No. MI20150377.
Italian Search Report dated Feb. 20, 2014 from counterpart Italian App No. BO20130297.
Italian Search Report dated Oct. 4, 2013 from counterpart Italian App No. BO20130052.
International Search Report from related PCT Application No. PCT/IB2014/058779.

* cited by examiner

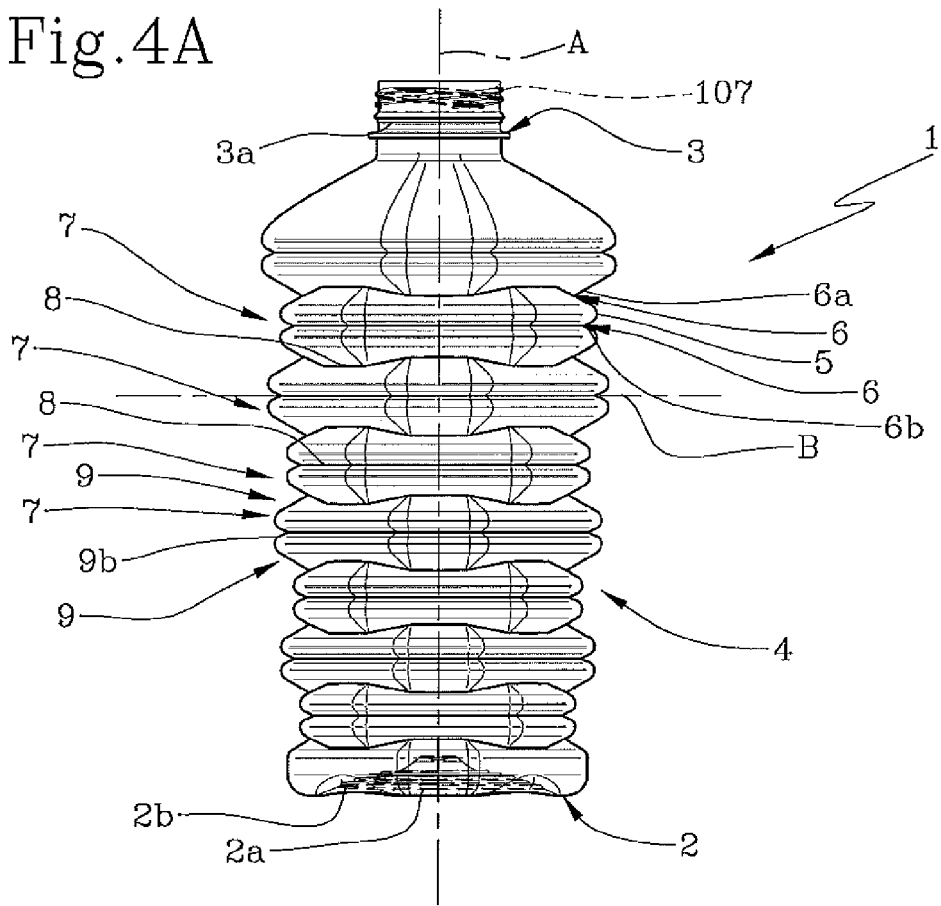
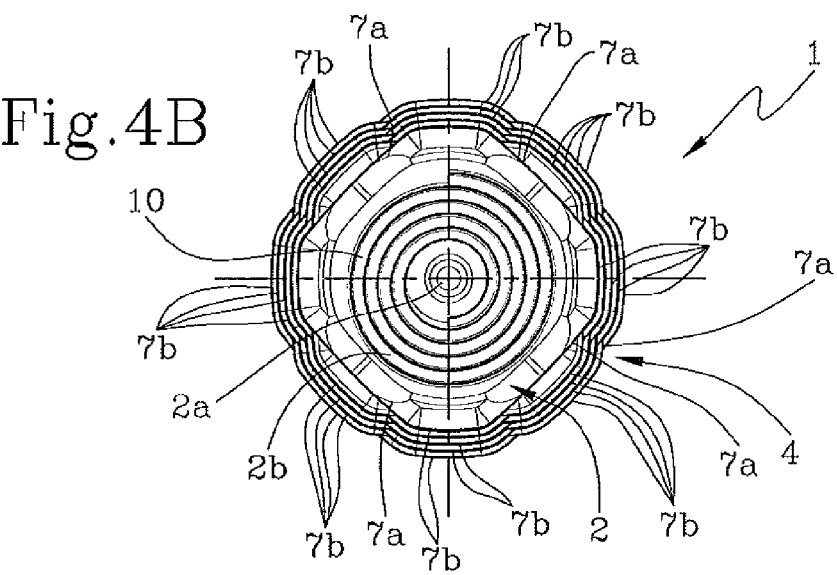

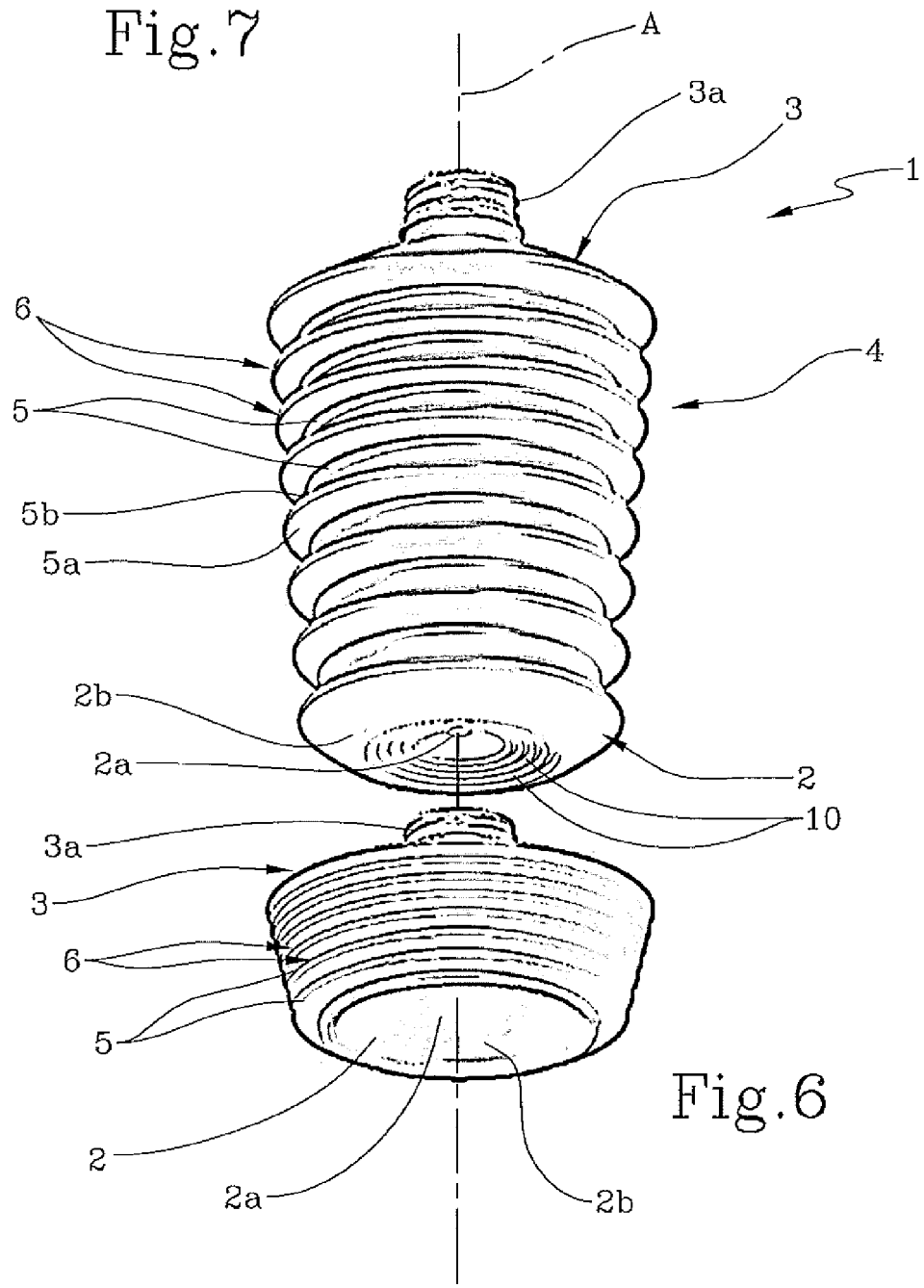

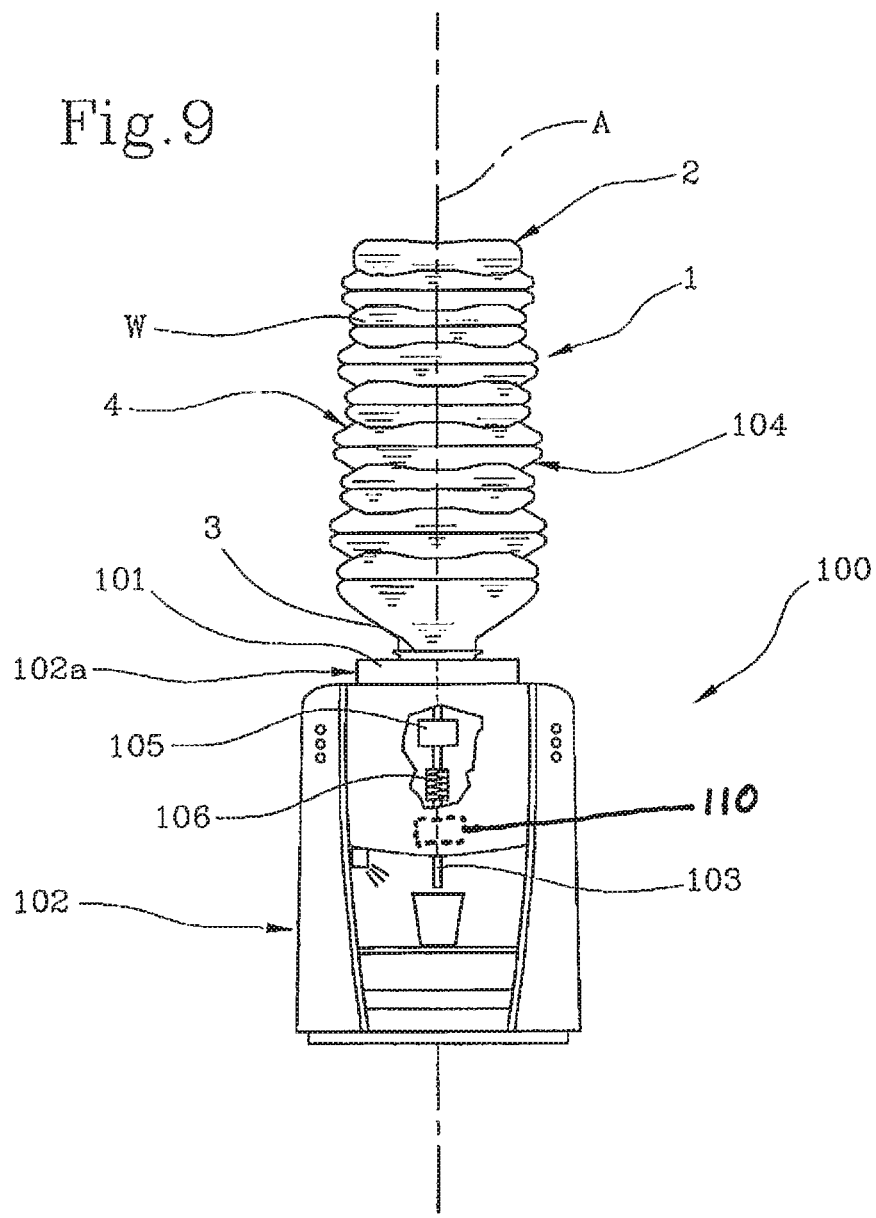

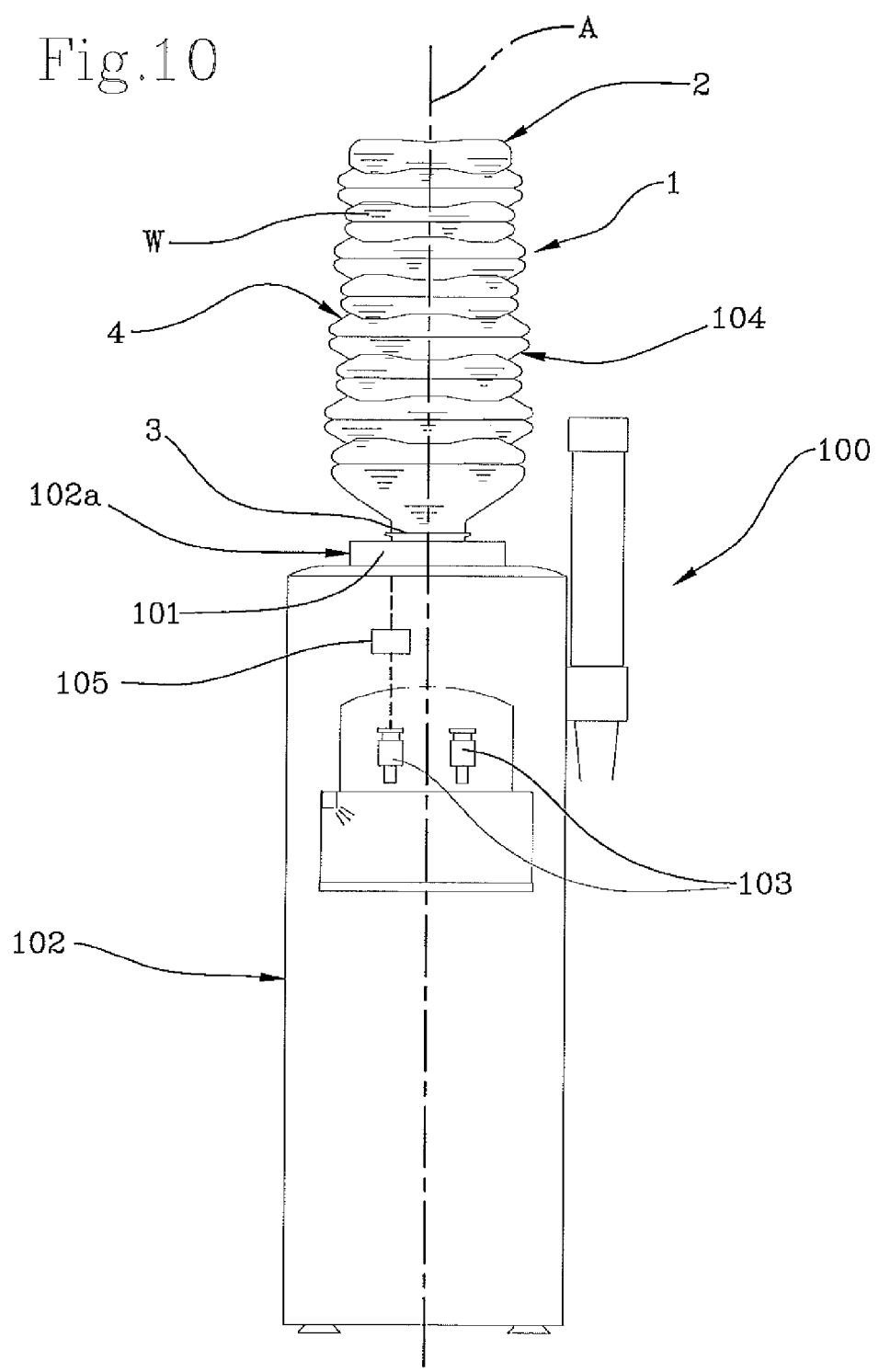

LIQUID CONTAINER FOR BEVERAGE DISPENSERS AND BEVERAGE DISPENSER COMPRISING SAID CONTAINER

This application is the National Phase of International Application PCT/IB2014/058779 filed Feb. 4, 2014 which designated the U.S. and that International Application was published under PCT Article 21(2) in English.

This application claims priority to Italian Patent Application Nos. BO2013A000052 filed Feb. 5, 2013 and BO2013A000297 filed Jun. 13, 2013. Both applications are incorporated by reference herein.

TECHNICAL FIELD

This invention relates to a container for food safe liquids, in particular a bottle or refill tank for containment of water to be used in beverage dispensers, and a beverage dispenser comprising the container.

More specifically, this invention refers in particular to a container (preferably disposable) for water dispensers, of the "water cooler" type, and coffee dispensers, both of the table-top and automatic type.

Thus, this invention is applicable in particular in the sector of automatic dispensing of coffee, as well as in the handling of dairy products, wine etc.

BACKGROUND ART

In the sector for the dispensing of water and in particular with regard to the water coolers present usually in offices or public places, there is a strongly-felt need to sanitise as much as possible the water remaining in the containers, since the prior art dispensers are particularly poor from the point of view of hygiene.

It should be noted that the storage of the water inside tanks or reservoirs may only be guaranteed for short periods of time, as the properties of the water supplying the dispensers are changeable from the moment it is stored.

For example, the stagnation associated with a low or inconsistent use and the thermal variations facilitate the proliferation of the bacterial colonies already existing in water, resulting in a degeneration of the bacteriological level after a few days, even within the framework of normal cleaning and sanitising of the parts in contact with the environment.

As is known, in effect, water is a major carrier of biological contaminants since even a water defined as "fit for drinking" has a bacteriological content (even though low) which finds the ideal environment to proliferate in the temperature range in which the dispensers referred to under this invention operate.

The colonies of bacteria, spores and toxins may only be destroyed by heating the water to a temperature of >121° C. (in 15 minutes, that is to say, after pasteurisation), which, however, is in strong contrast to the distribution of fresh water, but even with regard to hot beverages (such as, for example, coffee in pods, capsules or ground).

In effect, there are prior art teachings according to which in order to ensure an excellent quality of, in particular, coffee, but in general of all common hot beverages, the water temperature must be below boiling point (in general dispensers operate with values between 85° C. and 92° C.), since the reaching of temperatures near to 100° C. (boiling point of water at ambient pressure) would result in a bitter coffee, resulting in unpleasant flavours.

Moreover, in the case of dispensers of hot beverages, both the water arriving from the water mains and low mineral water are unsuitable for making a good coffee, resulting also in unpleasant flavours.

In effect, the water which comes from taps on the water mains, although it satisfies the purity and extremely high quality requirements, generally contains a high percentage of temporary hardness caused by the presence of carbonates.

The picture does not change even when low mineral water commonly found on the market is used, the total hardness values of which are not usually compatible with good quality beverages.

Moreover, in the case of water that flows from our taps, the high presence of chlorine causes malfunctioning and damage to the internal parts of the dispensers which limits the working life of the dispensers and at the same time results in high maintenance costs.

Alternatively, mainly with regard to water dispensers, bottles or the so-called "refill tanks" made of PET and/or similar plastic materials are often used, which are turned upside down and connected to the frame of the dispenser in such a way that the supply of the product occurs by gravity, in a necessarily "pressurised" environment.

To overcome the above-mentioned drawbacks, various kits are currently marketed, offered by the manufacturers of dispensing machines, as well as by firms in the vending sector, designed for cleaning and filtering the water, which, as well as complicating the maintenance processes for the machines and significantly increasing the operating costs, only marginally resolve the problems linked with bacterial contamination, water hardness and lime scale.

Alternatively, the prior art proposes certain solutions linked specifically to the refill tanks of water coolers, which, however, are not very practical and not free of drawbacks of various kinds.

For example, patent WO2010007744 is applied to a disposable bottle, the lateral walls of which are shaped in a concertina fashion for approximately half of their extension.

The other half, proximal to the bottom, does not have, on the other hand, the concertina and is described as being designed to collapse by inverting its extension so as to allow the (rigid) bottom to come close to the "neck" of the bottle and thus allow the empty volumes to be reduced, but not eliminated, once the maximum deformation is reached.

However, to make such a behaviour possible during deformation, the side walls cannot be made in an inexpensive fashion from polyethylene terephthalate (PET), that is, with the so-called "stretch blow moulding" process, which therefore makes the proposed solution completely out of step with the market.

Moreover, it should be noted how, even in the completely deformed configuration, the internal volume of the container remains considerable, which would in any case result in a considerable dispersion of unused water or, alternatively, the movement of unused volumes.

Moreover, since the side wall is completely flat in the end portion, the behaviour described cannot be achieved with certainty, and it certainly requires a high negative pressure action at the mouth of the container.

In light of this, although it aims to do so, the solution proposed by WO2010007744 cannot be currently made industrially at competitive costs and it is difficult to apply it to water coolers and to beverage dispensers more generally.

Other containers of a deformable type are known in the prior art, mainly linked with the need to reduce the dimensions during transport of the empty container. These containers, such as water flasks or the like, are not, however, of the disposable type, since they can be used several times.

In effect, the above-mentioned containers (such as that of patent document WO2011064523) are not made of PET and are not designed for containing liquid for a prolonged period of time.

Moreover, not arising from the need to prevent contact between air and water, these containers, although they reduce their own volume, do not minimise its internal volume, and simply reduce it sufficiently to simplify carrying in bags, handbags or backpacks.

Alternatively, there are prior art bottles shaped to favour their flattening (partial) in order to reduce the volume of the empty bottles, thus maximising the filling of waste disposal containers. These solutions, however, are limited to defining some lines of weakness along the side wall of the container, without any regard for the residual volume following the flattening, which is solely the result of the force applied by the consumer.

DISCLOSURE OF THE INVENTION

The aim of this invention is therefore to provide a container for food safe liquids, in particular water, for beverage dispensers and a beverage dispenser comprising the container which overcome the above-mentioned drawbacks of the prior art.

More specifically, the aim of this invention is to provide a container for food safe liquids, in particular water, which is able to easily maximise the deformation and minimize its internal volume.

In particular, the aim of this invention is to provide a container for food safe liquids, in particular water, which is able to collapse completely without the need to introduce air inside it for dispensing the liquid.

The aim of this invention is also to provide a container for food safe liquids, in particular water, which is simple and inexpensive to dispose of.

Moreover, the aim of this invention is to provide a beverage dispenser designed to maintain the original properties of the water used.

More specifically, the aim of this invention is to provide a beverage dispenser which is able to prevent contact between the outside air and the water inside the container.

These aims are achieved by a food safe container of liquids, in particular water, according to the present description.

Moreover, these aims are achieved by a beverage dispenser according to the present description.

More specifically, the aims are achieved by a food safe container of liquids, in particular water, for a beverage dispenser comprising a first end, or bottom wall, a second end, or neck, equipped with a portion for releasing the water and which is set up to be connected to a corresponding junction portion of a beverage dispenser and a tubular wall extending annularly along a respective main central axis between the first end and the second end.

According to this invention, the tubular wall extends along the central axis with a succession of ridges and grooves shaped in such a way as to make the tubular wall collapsible along the central axis to reduce its overall dimensions, so as to compensate the negative pressure generated inside the bottle during dispensing of the liquid, thus preventing contact between the liquid and the air outside the bottle.

In other words, the tubular wall has a structure substantially defined by a plurality of yieldable portions arranged one after another, each equipped with at least two rising faces positioned opposite each other to form the ridges.

Thus, the tubular wall of the container (made of polyethylene terephthalate PET, PE, PLA, or the like, preferably with the "stretch blow moulding" process) is shaped in such a way as to deform between an undeformed configuration of maximum extension along the central axis, and a deformed configuration, wherein its extension along the central axis is reduced by at least ⅔ relative to the maximum extension.

Thus, the tubular wall is substantially free to collapse along its entire extension.

More specifically, in a first embodiment of the container, the tubular wall comprises a plurality of annular sectors positioned relative to each other in succession along the central axis, each having a separate orientation relative to the two sectors adjacent to it, wherein the orientation is measured in a plane at right angles to the central axis.

In other words, the tubular wall is shaped by successive sectors each rotated (considering the central axis as the axis of "rotation") by a predetermined angle relative to the adjacent sector.

In this way, the deformation of the tubular wall is, advantageously, maximised.

In other words, the sectors are each offset relative to the adjacent sector, in such a way as to increase the yielding of the container along the central axis.

Thus, the structure of the tubular wall is divided into successive modules with the same geometry, but with the orientation and dimensions variable along the central axis.

Advantageously, the structure is very simple to construct and makes it possible to reduce the external volume of the container by more than 80%.

More specifically, the tubular wall extends, starting from the first end of the bottle container towards the second, with a decreasing cross-section transversal to the central axis, in order to minimize its extension along the central axis in the deformed configuration.

Thus, each sector (or module) as well as having a different orientation relative to the adjacent sector, has an extension (that is, the area of the transversal cross-section) which is different, to a greater or lesser extent as a function of which of the sectors is proximal to the first end.

Preferably, each sector has a transversal cross-section, measured in the plane at right angles to the central axis, having a geometry which is substantially polygonal and rotated, in the plane, by an angle of between 30° and 60°, more preferably 45°, relative to the transversal cross-section of the adjacent sectors.

In an alternative embodiment, the tubular wall has a saw tooth profile extending along the central axis.

In other words, the profile defines a pagoda-like structure, that is to say, a structure with successive slopes in a line all oriented with the same concavity (preferably oriented towards the neck of the bottle).

More specifically, each ridge of the tubular wall is defined by a first face and a second face joined to each other at the ridge itself, wherein the first face is convex and the second face is concave so as to form the saw tooth profile.

Advantageously, the structure is very simple to construct and allows the external volume of the container to be reduced by more than 70% (preferably more than 80%) by collapsing along its main axis.

It should also be noted that, in order to reduce as much as possible the internal volume of the container, the bottom wall, which comprises a central portion and a peripheral portion, is shaped in such a way that, at least in the deformed configuration of the tubular wall, the central portion is proximal to the neck of the bottle relative to the peripheral portion. Preferably, the central portion is substantially abutting the second end of the container.

Advantageously, the invention is "fully collapsible" since, when it reaches its smaller size, it has a residual internal volume substantially equal to zero.

It should be noted that, preferably, this configuration is reached following a deformation also of the bottom wall.

Thus, the bottom wall is shaped for deforming along the central axis of the tubular wall between a configuration with a minimum concavity, wherein the distance between the central portion and the peripheral portion measured along the central axis is at its minimum, and a configuration with a maximum concavity, wherein the distance between the central portion and the peripheral portion is at its maximum.

In other words, the bottom wall is shaped to increase its extension along the central axis of the container according to the consumption of liquid.

Thus, in the configuration with the maximum concavity of the bottom wall, the peripheral portion runs alongside the tubular wall and the central portion faces (abuts) the neck of the bottle in such a way as to reduce (minimise) the internal volume of the bottle.

Thus, in the deformed configuration, the container has a longitudinal cross-section (parallel to the central axis "A") which is substantially Y-shaped, wherein the leg of the Y is defined by the neck (or release portion) and the concavity is formed by the tubular wall and by the deformed bottom wall.

Preferably, the bottom wall is made using an innovative "spiral" structure, which is also designed to collapse, that is able to achieve a deformation corresponding, in terms of size and direction, to the second end (or neck, or shoulder) of the container which allows the maximum optimisation of the costs with respect to the maximum useful volume.

As indicated, the container according to this invention is used in association with a beverage dispenser.

Advantageously, thanks to the complete deformability and collapsibility of the structure of the container, it is possible for the dispenser to dispense the water without it coming into contact with the inside of the container, thus guaranteeing the hygiene.

In this regard, the dispenser preferably comprises suction means operatively interposed between the dispenser and the container, designed to generate a negative pressure at the second end (or neck) of the container so as to suck the water to be dispensed facilitating the deformation of the tubular wall of the container.

Moreover, the dispenser conveniently comprises at least one plug unit associated with the housing of the container and switchable between an operating configuration, wherein it allows the passage of the water from the container to the dispenser, and a blocked configuration, wherein it prevents the passage of fluids from the housing towards the dispenser.

Advantageously, in this way it is guaranteed that also in the absence of the container or when the latter is empty, the air does not contaminate the conduits.

In this regard, the dispenser (or the container) is also equipped with a non-return valve operatively interposed between the dispenser and the container and configured to prevent the passage of fluids in the direction of the container.

Advantageously, when this valve is associated with the container, after the container is completely deformed it keeps its minimum dimensions configuration with significant advantages from the point of view of the disposal.

BRIEF DESCRIPTION OF THE DRAWINGS

Further features and advantages of this invention are more apparent in the detailed description below, with reference to a preferred, non-restricting, embodiment of a food safe container of liquids, also for beverage dispensers, and a beverage dispenser as illustrated in the accompanying drawings, in which:

FIGS. 3a, 3b, 4a and 4b show side and plan views of the container of FIG. 1;

FIG. 5 shows the cross section B-B of FIG. 4a;

FIGS. 6 and 7 show perspective views of a second embodiment of the food safe container of liquids for beverage dispensers according to this invention, in two different configurations;

FIGS. 9 and 10 schematically show two different embodiments of a beverage dispenser according to this invention, on which the container of FIG. 1 is mounted.

DETAILED DESCRIPTION OF PREFERRED EMBODIMENTS OF THE INVENTION

Figure 1:
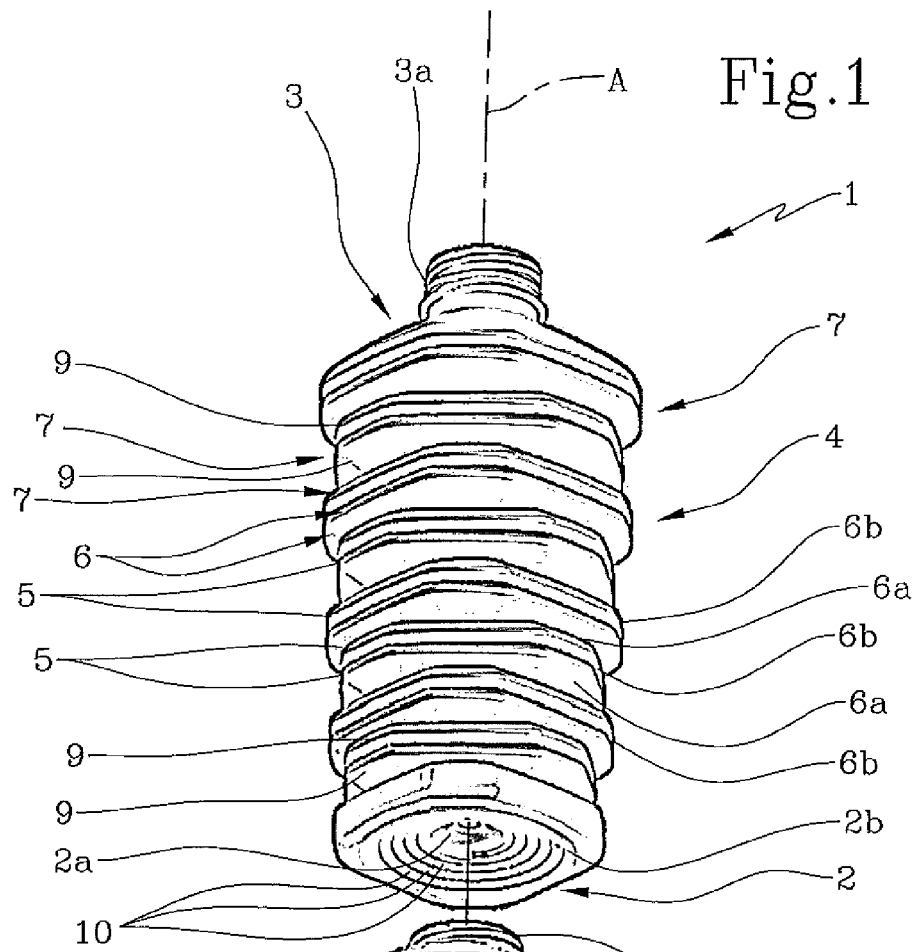
FIGS. 1 and 2 show perspective views of a first embodiment of the food safe container of liquids for beverage dispensers according to this invention, in two different configurations.

With reference to the accompanying drawings, the numeral 1 denotes a food safe container of liquids, preferably water, according to this invention.

The container 1, since it is designed mainly for food use, is made of polyethylene terephthalate (PET, PET, PETE, PETP or PET-P) or the like.

Preferably, the container 1 comprises water "W" having optimum characteristics for making wholesome and good quality beverages.

More specifically, the water "W" has, in the case of dispensers for hot beverages, in particular coffee:

total hardness of between 5 and 14° dH, preferably between 7 and 12° dH, even more preferably approximately 9° dH, and/or carbonate hardness of between 2 and 5° kH, preferably between 3 and 4° kH, and/or pH of between 6 and 8, preferably between 6.5 and 7.5.

Advantageously, a water of this kind is always fresh and pure, without recognisable odours, for a richer coffee aroma, of excellent quality.

Alternatively, the container 1 can be made from any material suitable for use in the food sector, such that it does not adversely affect the quality of the liquid which it holds, compatibly with the technology at the time.

The container 1 is thus a food safe container of liquids, in particular a container of water for beverage dispensers 100, preferably of the disposable type.

The container 1 is of the "refill tank" type that is to say, a bottle; it comprises a first end, or bottom wall 2, a second end, or neck 3, equipped with a portion 3a for releasing the water set up to be connected to a corresponding junction portion 101 of the beverage dispenser 100 and a tubular wall 4 extending annularly along its own central axis "A" between the first end 2 and the second end 3.

The first end 2, or base wall, thus constitutes a wall transversal to the central axis "A" and is equipped with at least one substantially planar perimetric edge to act as a supporting surface of the container 1.

The second end 3 defines, on the other hand, the top portion of the container 1. Preferably, the second end 3 comprises an upper shoulder 3b for connecting the release portion 3a with the tubular wall 4.

In the preferred embodiment, the shoulder 4 has a sufficient stiffness to support the weight of the container 1 full of liquid, that is to say, of water "W". This feature is particularly advantageous in the application of the container in beverage dispensers, in particular column dispensers 100 of water "W", wherein the container is positioned with the head down, that is to say, with the second end 3 located at a level lower than the first end 2.

The release portion 3a is, preferably, formed by the neck of the container 1, that is, a substantially annular element equipped with means 3c for fixing a cap (not illustrated) and/or means for connecting the container 1 to the beverage dispenser 100 (in particular to a receiving portion 102a thereof).

In the embodiment illustrated, the connection means and the fixing means 3c substantially correspond to and are defined by a thread.

Preferably, also, at the neck 3a there is a lime scale removal, water softening filter, made for example from resins, activated carbon and the like, which is advantageous in an application of the "table top" espresso coffee machines.

According to the invention, the tubular wall (or lateral wall) 4 extends along the central axis "A" with a succession of ridges 5 and grooves 6 shaped in such a way as to make the tubular wall 4 collapsible along the central axis "A" to reduce the overall dimensions of the container, so as to compensate the negative pressure generated inside the container during dispensing of the liquid preventing contact between the liquid and the air outside the container.

It should be noted that, preferably, the succession of ridges 5 and grooves 6 extend substantially continuously between the first 2 and the second end 3 of the container.

In other words, the tubular wall 4 has a profile of peaks (that is, the ridges 5) and dips (that is, the grooves 6).

It should be noted that the term "profile" means in effect the contour line formed by the tubular wall 4 in a side view of the container.

The tubular wall 4 is therefore collapsible along its entire extension thanks to its concertina structure.

More specifically, the tubular wall 4 is shaped in such a way as to deform between an undeformed configuration, with maximum extension along the central axis "A", and a deformed configuration, where its extension along the central axis "A" is reduced by at least ⅔ compared to the above-mentioned maximum extension.

In the preferred embodiment, the reduction is greater than 70% of the extension of the tubular wall 4 along the central axis "A" (when it is in the undeformed configuration), more preferably greater than the 80% (that is to say, ⅘).

Preferably, tubular wall 4 of the container 1 extends, starting from the first end 2 towards the second end 3, with a decreasing cross-section transversal to the central axis "A", so as to minimise its extension along the central axis "A" in the deformed configuration.

In other words, the tubular wall 4 has the shape of a truncated pyramid with a section decreasing towards the bottom wall 2.

More specifically, each transversal section (to the central axis "A") has a geometry extending along two main directions substantially at right angles to each other.

In accordance with what is stated above, the main dimensions of a transversal cross-section which is proximal to the second end 3 of the container are (both) larger than the corresponding main dimensions of a transversal cross-section which is distal from the second end 3.

In a first embodiment, the tubular wall 4 has a profile having a plurality of first grooves 6a and a corresponding plurality of second grooves 6b which are alternated along the central axis "A".

The first grooves 6a have a depth, measured radially from the central axis "A", which is greater than that of the second grooves 6b.

Thus, the distance between the ridge 5 and the respective first groove 6a is greater than the distance between the same ridge 5 and the respective second groove 6b.

It should be noted that the distance is measured radially, that is to say, at right angles to the central axis "A".

Figure 2:
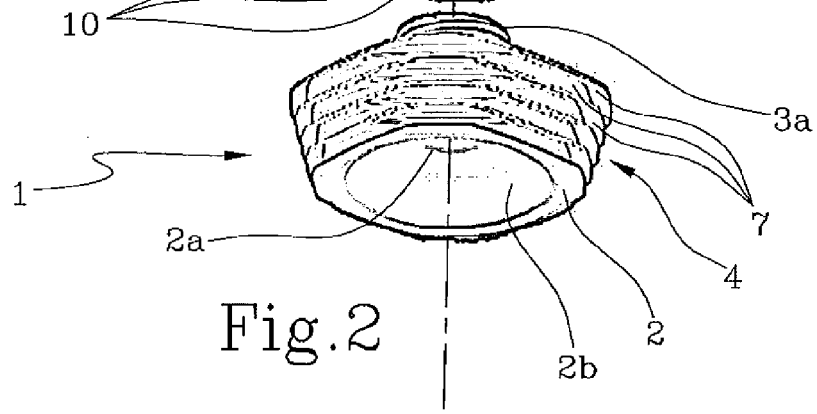
Figure 3A:
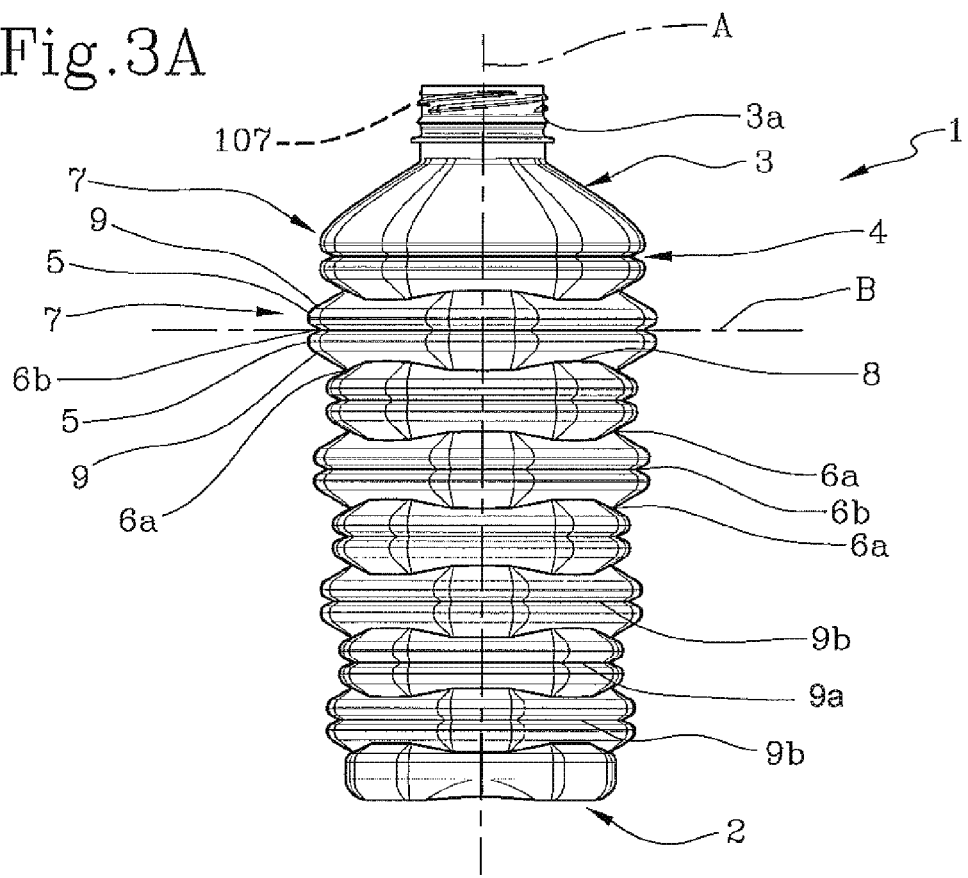
Figure 3B:
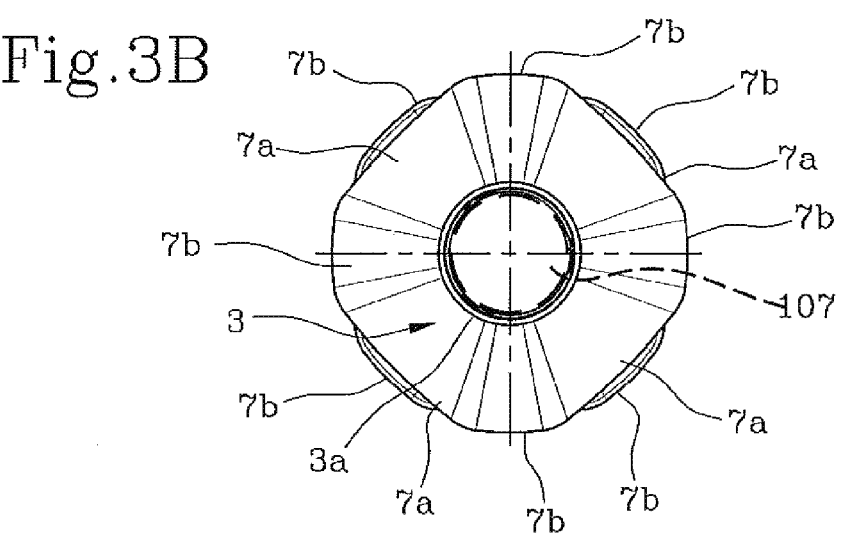
Figure 5:
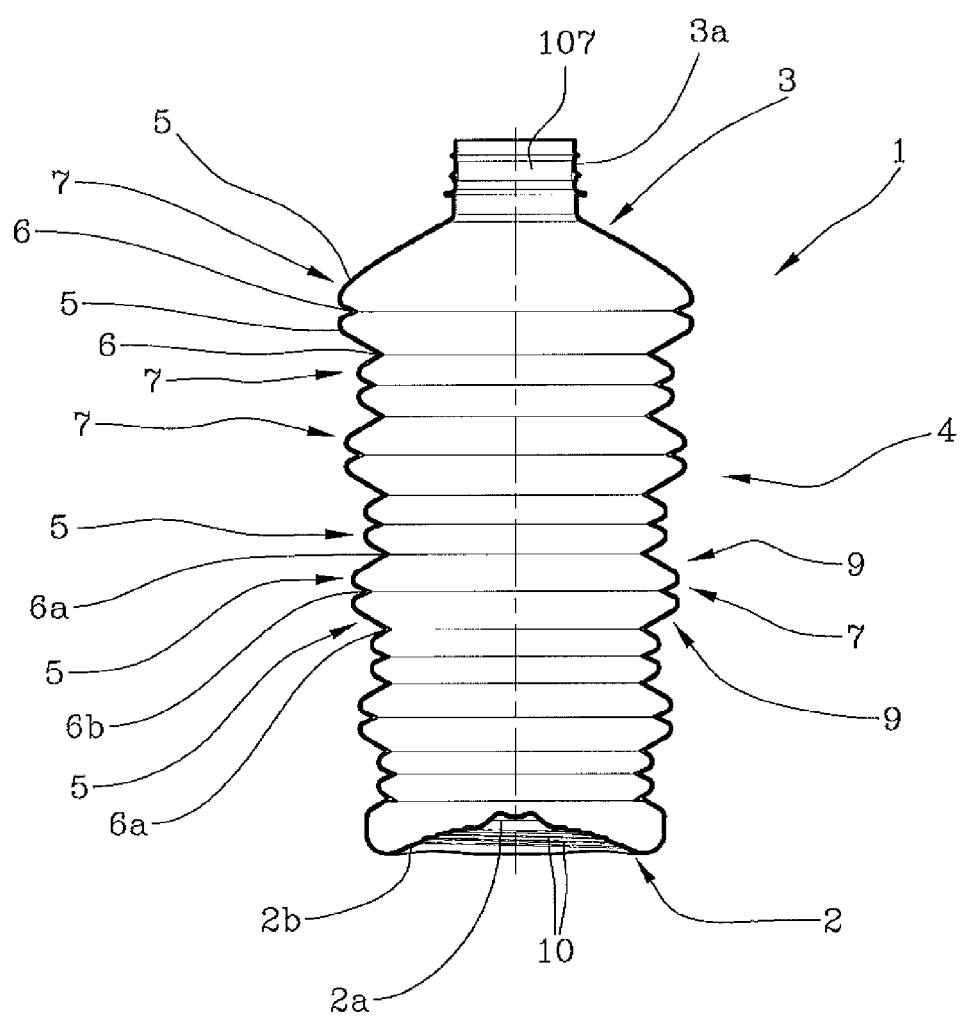

With reference to FIGS. 1 to 5, the tubular wall 4 comprises a plurality of sectors (or modules) 7 annular to each other positioned in succession along the central axis "A".

The term "sector" in this text denotes an element having a respective geometry (partly corresponding to that of the above-mentioned cross-section) which can be inferred and isolated from that of the other sectors 7, wherein a joining line 8 between adjacent sectors 7 can preferably be defined.

Preferably, each sector 7 has a separate orientation relative to the two sectors 7 adjacent to it. It should be noted that the orientation is measured in a plane "B" at right angles to the central axis "A".

Thus, the sectors of the tubular wall 4 are substantially offset from each other. In other words, each sector 7 has a transversal cross-section (lying in the plane "B") having respective geometry having two main directions (or dimensions). The main direction of the transversal cross-section of a sector 7 defines an angle with the corresponding main direction of the transversal cross-section of the adjacent sector 7 (that is to say, before or after along the central axis "A").

Preferably, the transversal cross-section of each sector 7 has geometry which is substantially polygonal. In the embodiment illustrated, the transversal cross-section of each sector 7 is rotated, in the plane "B", by an angle of between 30° and 60° relative to the transversal cross-section of the adjacent sectors 7, preferably by approximately 45°.

In this embodiment, the transversal cross-section of each sector 7 has a geometry which is substantially octagonal; preferably, the transversal cross-section is equipped with four long sides 7a and four short sides 7b.

In light of this (as can be inferred from FIG. 3b), each long side 7a of the transversal cross-section of a sector 7 is substantially parallel to a corresponding short side 7b of the transversal cross-section of the adjacent sector 7 (thus, of the sectors 7 before and after along the central axis "A").

Preferably, each sector 7 has an M-shaped profile, provided with two ridges 5 between which a second groove 6b is interposed.

Thus, the first grooves 6a (which are alternated with the second grooves 6b) are defined by the joining line 8 between two adjacent sectors 7.

Advantageously, the geometry facilitates both the compression of a sector 7 on the next one, and of the separators of each sector 7.

It should be noted that the second grooves 6b in particular define a line of separation of each sector 7 into two half-parts 9, preferably having the same geometry.

Thus, each sector 7 comprises two half-parts 9 connected together and preferably on opposite sides, that is to say mirroring each other.

In the preferred embodiment, the half-parts 9 are concave and connected together so that their respective concavities are opposite each other.

In other words, their concavities extend between an edge of smaller extension 9a and an edge of larger extension 9b and each half-part 9 is connected to the other at the edge of larger extension 9b.

Preferably, each half-part 9 has geometry which is substantially of a truncated pyramid shape extending between the edge of smaller extension 9a and the edge of a larger extension 9b.

Thus, each sector is defined by two walls in the shape of truncated pyramids (octagonal) facing each other and deformable (elastically) in such a way as to abut against each other during dispensing of the liquid from the container 1.

Figure 8A:
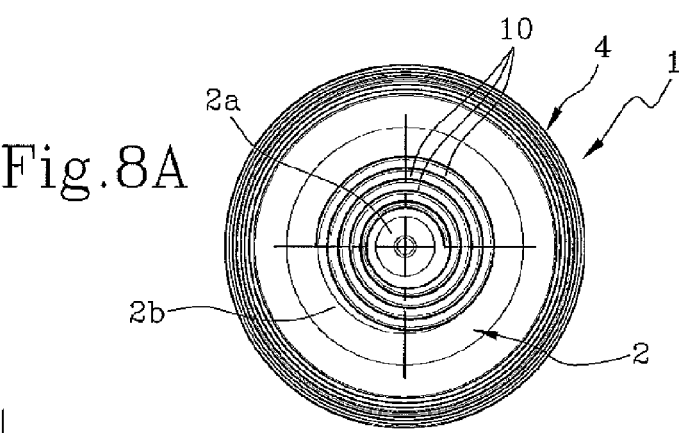
FIGS. 8a, 8b, and 8c show side and plan views of the container of FIG. 6.
Figure 8B:
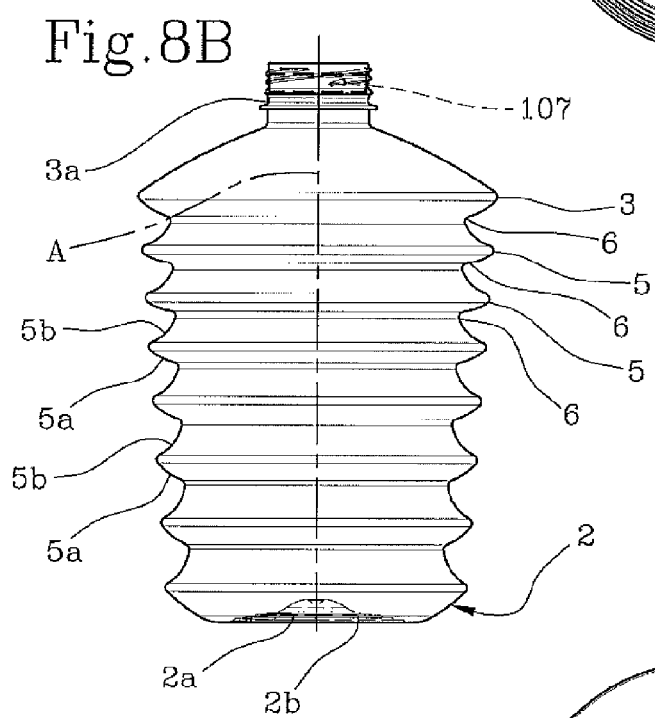
Figure 8C:
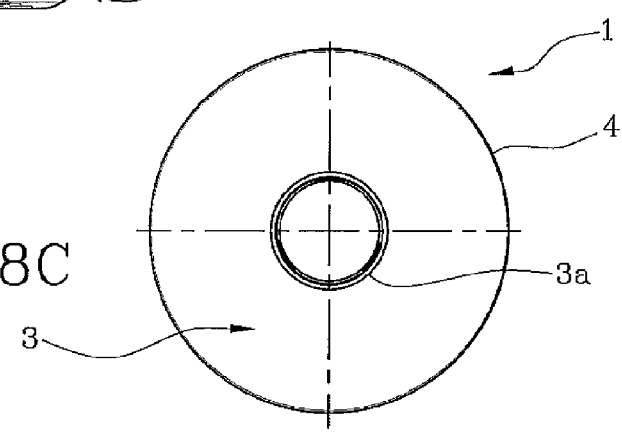

With reference to FIGS. 6 to 8c, the tubular wall 4 has a saw tooth profile extending along the central axis "A".

The expression "saw tooth" is used in this text to denote a profile defining a succession of ridges 5 and grooves 6, wherein each ridge is defined by a first face 5a (rising) and a second face 5b (rising) having slopes (measured relative to the central axis 5) which are different (significantly).

In the preferred embodiment, the above-mentioned saw tooth profile substantially forms a pagoda-shaped structure.

In other words, at least the less inclined face (second face 5b) of each tooth (or ridge 5) forms a concave curve, which is concordant with the concavities of the corresponding face of the other ridges 5. In other words, the above-mentioned faces form slopes of similar geometry.

In the embodiment illustrated, the second faces 5b all have the concavities facing towards the second end 3 of the container 1.

Preferably, the first face 5a is convex, whilst the second face 5b is concave, so as to form a "curved" saw tooth profile.

Advantageously, this structure is particularly simple to construct using the stretch blow moulding process commonly used in the production of PET containers (or the like).

It should be noted that, in order to reduce as much as possible the internal volume of the container 1, the bottom wall 2 comprises a central portion 2a and a peripheral portion 2b and is shaped in such a way that, at least in the deformed configuration of the tubular wall 4, the central portion 2a is proximal to the neck (or second end) 3 of the container 1 relative to the peripheral portion 2b.

In other words, the bottom wall 2, at least in the deformed configuration of the tubular wall 4, forms in turn a concavity facing the outside of the container 1 in order to follow the geometry of the tubular wall 4, minimising the internal volume of the container, thus guaranteeing a complete consumption of the liquid.

Preferably, the bottom wall 2 is shaped for deforming along the central axis "A" of the tubular wall 4 between a configuration with a minimum concavity, wherein the distance between the central portion 2a and the peripheral portion 2b measured along the central axis "A" is at its minimum, and a configuration with a maximum concavity, wherein the distance between the central portion 2a and the peripheral portion 2b is at its maximum.

In other words, the bottom wall 2 is also deformable. More specifically, the bottom wall 2 is deformable in the same direction of deformation as the tubular wall 4.

More specifically, the bottom wall 2 is a membrane deformable between a configuration of minimum extension along the central axis "A" and a configuration of maximum extension along the central axis "A", corresponding respectively to the minimum concavity configuration and the maximum concavity configuration.

Advantageously, this guarantees minimising the internal volume of the container 1 after deformation without adversely affecting its capacity; the capacity can reach up to 5 or 10 liters.

It should be noted that, in the configuration with the maximum concavity, the peripheral portion 2b of the bottom wall 2 runs alongside the tubular wall 4. Moreover, in this configuration, the central portion 2a of the bottom wall 2 faces the neck 3 of the container in such a way as to reduce the internal volume of the container.

More specifically, in the configuration with the maximum concavity the central portion 2a is abutted to the shoulder 3 of the container 1.

In order to allow this deformation, the bottom wall 2 is equipped with one or more annular crease lines 10 configured for favouring the deformation of the bottom wall 2 from the configuration with a minimum concavity to the configuration with a maximum concavity.

In other words, in the configuration with the minimum concavity, the bottom wall 2 has a structure with steps, which can be "stretched" to pass to the configuration with the concavity maximum.

In other words, the bottom wall 2 substantially has a concertina structure which is deformable between a flattened configuration (with minimum concavity) and an extended configuration (with a maximum concavity).

Preferably, the concertina is defined by the crease lines 10.

Thus, the crease line 10 (or crease lines) defines a concertina for deforming the bottom wall 2.

Preferably, the crease line 10 is a spiral extending from the peripheral portion 2b to the central portion 2a.

Advantageously, this shape is easy to make and highly efficient in allowing the deformation of the bottom wall 2a also with a low negative pressure at the neck 3 of the container 1.

Alternatively, the bottom wall 2 might comprise at least one S-shaped annular portion deformable elastically in such a way as to be able to extend.

In a preferred embodiment, the container 1 is equipped with a non-return valve associated with the release portion 3a (that is to say, the neck) so as to prevent return of the structure (in particular of the tubular wall 4 and of the bottom wall 2) into an unformed configuration.

Advantageously, besides ensuring the lack of contact between the air outside and the liquid inside the container 1, this makes it possible to keep the volume of the container to a minimum during disposal.

This invention also relates to a beverage dispenser 100, in particular of water "W" or coffee, configured to interface with the container 1 described above by deforming it.

It should be noted that the term "beverage dispenser" refers both to large, automatic beverage dispensers and to small dispensers which are not necessarily equipped with multi-purpose mixers, which are typically of the "table-top" type.

More specifically, the term "beverage dispenser" means a dispenser of hot drinks, typically coffee, of the "table-top" type, or a water dispenser, either of the automatic or manual type, equipped with a water tank located, for example, on the top (the so-called water-coolers).

The term "beverage dispenser" also refers to an automatic dispenser of hot beverages, such as espresso, cappuccino, American coffee, tea or chocolate, which is able to autonomously perform the mixing and infusion of the products after selection by a user. These dispensers are typical inside offices or public areas.

In general, the dispenser 100 according to this invention comprises a supporting frame 102 associated with at least one dispenser 103 designed to dispense a beverage.

More specifically, the dispenser 100 comprises at least one tank 104 of water "W" associated with the frame 102 and the dispenser 103 is associated with the tank 104 for dispensing a beverage containing the water "W".

In other words, the tank 104 of water "W" is connectable to the dispenser 103 for making the beverage, both directly (when the beverage is water) and after mixing in a mixing chamber 110 with infusion products, such as coffee.

The tank 104 is preferably of the disposable type.

The term "disposable" is used in this text to denote a container 1 which cannot be reused once emptied, unless it is recycled, either totally or partially, followed by a new filling cycle by the manufacturer (according to suitable recycling procedures).

It should be noted that the tank 104 is, even more preferably, a container 1 as described above, that is to say, a container deformable along its main axis "A", preferably made of PET (or the like), and provided with the bottom wall 2, the neck 3 and the tubular wall 4.

The container 1 is associated (can be associated) to the frame 102 and can be connected to it rigidly or by using suitable deformable conduits.

In this regard, the frame 102 is preferably provided with at least one housing 102a equipped with a junction portion 101 which can be coupled with the container 1.

Preferably, since the container 1 is of the disposable type, the junction portion 101 is shaped to allow successive coupling and uncoupling with different containers 1.

Thus, the container 1 is removably connectable to the housing 102a, in particular to the junction portion 101 thereof.

In the embodiments illustrated, the container is shaped substantially in the form of a bottle or refill tank and the release portion 3a defines the neck, that is, an end narrowing in which the water that is about to escape is channelled.

Preferably, the junction portion 101 of the dispenser 100 is connected (connectable) to the release portion 3a of the container, more preferably using quick coupling means (not illustrated).

Advantageously, in this way it is possible to keep the seal between the container 1 and the junction portion 101 of the dispenser 100, without the air outside contaminating the water "W" inside the container 1.

Thus, the quick coupling means are configured to keep the seal of the connection, both by gaskets and, if necessary, valves.

The quality of the water circulating in the dispenser 1 is therefore guaranteed, making it possible to connect the container 1 pre-filled with water having excellent characteristics for making beverages.

It should be noted that the term "quick coupling means", can mean:
flat face couplings,
screw couplings,
valve couplings,
elastic snapfit devices,
or other quick connection means of known type.

Preferably, to favour the simplicity of connecting, the release portion 3a of the container 1 and the junction portion 101 of the dispenser 100 define a male-female coupling, wherein the release portion 3a defines the male part and the junction portion 101 defines the female part.

To favour the deformation of the container 1 along its central axis "A", that is to say, the collapse of the structure during dispensing of the water "W", the dispenser 100 comprises suction means 105 operatively interposed between the dispenser 103 and the container 1 designed to generate a negative pressure at the second end 3 (in particular at the release portion 3a) of the container 1 so as to suck the water "W" to be dispensed, deforming the tubular wall 4.

Thus, the suction means 105 (in conjunction with the force of gravity) define means for deforming the container 1 along the central axis "A" to reduce its volume in proportion to the residual amount of water "W" remaining inside the container 1.

Thus, the suction means 105 are in fluid communication with the inside of the container 1 and comprise a unit for generating a vacuum which can be operatively activated (after selection of a beverage by the user) for generating the above-mentioned negative pressure in the proximity of the second end 3 of the container 1 in order to suck water.

Preferably, the suction means 105 comprise at least a volumetric pump.

Alternatively, the suction means 105 might comprise a vibration pump.

Thus, the dispenser 100 is configured to reduce the volume of the container 1 in proportion to the consumption of water "W", thereby overcoming the need to introduce air (drawn from the environment) inside the container 1 to allow the escape of the water (compensating the atmospheric pressure).

In other words, the quantity of air inside the container 1 (when the packaging of the latter is not "vacuum sealed") remains constant during the entire working life, preventing air from the environment from contaminating the contents, thereby preventing the proliferation of bacteria in the water "W".

Thus, to ensure the supply of the beverage dispensers according to this invention the presence of a pressurised tank is not necessary (that is to say, where the air is introduced at atmospheric pressure) to allow dispensing.

The expression "means for deforming the container" is used in this text to denote that the suction means comprise a suction pump whose power is high enough to oppose the natural resilience of the container 1, that is, to overcome the tendency of the container to maintain its original shape.

Thus, the "means for deforming the container 1" are configured for moving the first end 2 towards the second end 3.

In other words, the means for deforming the container 1 contribute to deforming the container 1 from the undeformed configuration, of maximum dimensions, wherein the first end 2 is distal from the second end 3, to the deformed configuration, of minimum dimensions, wherein the first end 2 is proximal to the second end 3.

Preferably, the dispenser 100 also comprises heating means 106 associated with the container 1 to raise the temperature of the water "W".

The heating means 106 are preferably associated with a supporting portion, so as to raise the temperature of the water "W" mainly at the second end 3 of the container 1, that is to say, where there is the water "W" which is close to use.

Alternatively, or in addition, the dispenser 100 comprises (that is to say, the heating means 106 comprise) a heating chamber (not illustrated) interposed between the support and the dispenser 103, upstream or downstream of the suction means 105, to perform locally the heating of the water.

Also, it is possible to provide a coil (or other heating means) distributed along the connecting conduit between the container 1 and the dispenser 103.

Advantageously, this solution would allow small quantities of water to be heated (equal substantially to small stretches of the conduit) for the entire path between the container 1 and the dispenser 103, making it possible to achieve the correct temperature at the dispenser 103.

Preferably, in order to guarantee the hygiene of the conduits, the dispenser comprises a plug unit (not illustrated) associated with the housing 102*a* and switchable between an operating configuration, wherein it allows the passage of the water "W" from the container 1 to the dispenser 103, and a blocked configuration, wherein it prevents the passage of fluids from the housing 102*a* towards the dispenser 103.

The plug unit is preferably defined by a floating element movable between a raised position, corresponding to the operating configuration, and a lowered position, corresponding to the blocked configuration, depending on the presence or absence of water inside the container 1.

In other words, the plug unit is defined by a ball check valve which, positioned outside the flow, ensures the free passage during operation. Once the water inside the container 1 is finished, the ball is positioned in such a way as to "seal" the coupling so as to avoid any bacterial contamination of the water contained in the conduits during the step for replacing the container 1.

It should be noted that, alternatively, the plug unit may be of the mechanical/electromechanical type which can be operated by a control unit at a predetermined operating condition (for example, container empty/full).

In accordance with the above with regard to the container 1, it should be noted that the dispenser 100 comprises (associated with the container 1 or the junction portion 101) a non-return valve 107 operatively interposed between the dispenser 103 and the container 1 and configured to prevent the passage of fluids in the direction of the container 1.

The invention achieves the proposed aims and brings significant advantages.

In effect, the container made in this way prevents contact between the beverages contained inside it and the air of the environment during the entire life cycle, whether it is associated with dispensers and/or the like or when it is used for handling. This allows the contents to always maintain their freshness intact, to be as bacteriologically pure as when bottled, even during dispensing. It is, in particular, a new, origina, and inexpensive solution to a technical problem of the prior art referred to the water supply reservoirs of espresso coffee machines (table top type), water coolers, beverage dispensers and the like, which involve contact of the water with the air of the environment.

The invention also represents a new and original solution for transporting and handling sparkling and still beverages, wine, oil etc.

Moreover, the use of a concertina-type tubular wall and a deformable base makes the container completely collapsible since, when it reaches its smaller size, it has a residual internal volume substantially equal to zero.

In effect, the container according to this invention comprises side walls which are free to collapse over their entire extension and a bottom wall which is deformable to compensate the residual volume of the side walls (tubular wall).

It should be noted that, advantageously, in the preferred embodiment, the bottom wall has a maximum concavity configuration (deformed) wherein the geometry corresponds, in terms of size and direction, to the so-called "shoulder" of the container, thereby minimising the residual internal volume.

The deformation of the container may be determined by means of compression exerted manually and/or mechanically, but preferably by the "vacuum" produced by the suction pumps associated with water coolers, beverage dispensers and the like.

In a preferred embodiment, the container is made from superposed independent structural elements (sectors), with a "draw" angle of approximately 35°, rotated between each other and equidistant to form a frustoconical geometry in order to reduce the natural resistance of the container to compression.

It should be noted that each sector consists of a number of connectors which allow a "controlled" axial deformation of the container, thereby excluding the risk of instabilities (pendulum effect).

In the second preferred embodiment (pagoda type), the container is made from a single structural element, again having a "draft" angle of approximately 35°.

Moreover, advantageously, the container is made of PE, PET or PLA resin in order to retain the freshness and purity of the beverage.

Moreover, the proposed shape allows the product to be made with the "stretch blow moulding" process, which is particularly inexpensive for making large volumes.

The container according to this invention is also an environmentally-friendly solution since it drastically limits the effects linked with the current processes for disposing of "empties". It eliminates the risk that the empty containers are sent for disposal in their configuration of maximum dimensions, that is to say, transported, in their configuration of maximum dimensions, to the "shredding" plants.

It should be noted that the structure of the container according to this invention is able to impart a rigidity to the container which is greater than that of the containers commonly available on the market (water bottles), despite a reduction in the blow-moulding material of approximately 20-30%, with the Stretch Blow Moulding (SBM) technique in which a semi-finished product, called a "preform", is used, made in turn by injection moulding.

The container, when full, therefore has the capacity to oppose the deformation on its main axis (vertical) in a manner comparable with the containers commonly available on the market, but on its secondary axis it's rigidity is much higher, such as to allow its stacking on the main axis.

This rigidity, as already mentioned, is obtained thanks to the superposing of structurally independent modules, to prevent out-of-roundness.

Thanks to this structure there is no longer the need to "massively" dose the bottom and the neck of the container, as occurs with the common containers in order to guarantee the packaging, stackability and handling standards.

Advantageously, moreover, the natural tendency of commonly available containers to return to the original shape is resisted. Thus, the residual minimum "empty" size is maintained after use without external intervention. This therefore reduces to a minimum the pollution during the disposal step.

The invention claimed is:

1. A container for food safe liquids for beverage dispensers, comprising:
   a first end, or bottom wall;
   a second end, or neck, equipped with an outlet portion for liquid configured to be connected to a corresponding joining portion of a beverage dispenser;
   a tubular wall extending annularly along a central axis between the first and the second end;
   wherein the tubular wall extends along the central axis with a succession of ridges and grooves shaped to make the tubular wall collapsible along the central axis to reduce overall dimensions of the container, to compensate for negative pressure generated inside the container during dispensing of the liquid and preventing contact between the liquid and air outside the container; and wherein the tubular wall comprises a plurality of annular sectors positioned relative to one another in succession along the central axis, each having a different orientation relative to two adjacent sectors, wherein the orientation of each annular sector is measured in a plane of the annular sector, the plane at a right angle to the central axis;

wherein the tubular wall has a profile having a plurality of first grooves and a corresponding plurality of second grooves alternating with each other along the central axis, wherein the first grooves have a depth, measured radially relative to the central axis, greater than that of the second grooves, and wherein each sector comprises two concave annular half parts connected and superposed to each other in such a way that their respective concavities are facing each other to define an M-shaped profile, with two ridges between which a second groove is interposed.

2. The container according to claim 1, wherein the succession of ridges and grooves extends substantially continuously between the first end and the second end of the container.

3. The container according to claim 1, wherein the container is made of at least one chosen from polyethylene terephthalate PET, PE, and PLA using a stretch-blow molding process.

4. The container according to claim 1, wherein the tubular wall is shaped to deform between an undeformed configuration, with maximum extension along the central axis, and a deformed configuration, where an extension of the tubular wall along the central axis is reduced by at least ⅔ compared to the maximum extension.

5. The container according to claim 1, wherein the tubular wall extends, starting from the first end of the container towards the second end, with a decreasing cross-section transversal to the central axis, to minimise the extension along the central axis in the deformed configuration.

6. The container according to claim 1, wherein each sector has a transversal cross-section, measured in the plane, having a substantially polygonal geometry; the transversal cross-section of each sector being rotated, in the plane, by an angle of between 30° and 60° with respect to the transversal cross-section of the adjacent sectors.

7. The container according to claim 1, wherein the transversal cross-section of each sector is rotated, in the plane, by approximately 45° with respect to the transversal cross-section of the adjacent sectors.

8. The container according to claim 1, wherein each sector has a transversal cross-section, measured in the plane, having a substantially octagonal geometry with four long sides and four short sides.

9. The container according to claim 8, wherein each long side of the transversal cross-section of a sector is substantially parallel to a corresponding short side of the transversal cross-section of the adjacent sector.

10. The container according to claim 1, wherein the first grooves are defined by a joining line between two adjacent sectors.

11. The container according to claim 1, wherein each half part has a substantially truncated pyramid geometry extending between an edge of smaller extension and an edge of larger extension, wherein each half part is connected to the other at the edge of larger extension.

12. The container according to claim 1, wherein the bottom wall comprises a central portion and a peripheral portion and is shaped such that, in the deformed configuration of the tubular wall, the central portion is proximal to the neck of the container relative to the peripheral portion.

13. The container according to claim 12, wherein the bottom wall is shaped for deforming along the central axis of the tubular wall between a configuration with a minimum inward concavity, wherein a distance between the central portion and the peripheral portion measured along the central axis is at a minimum, and a configuration with a maximum inward concavity, wherein the distance between the central portion and the peripheral portion is at a maximum.

14. The container according to claim 13, wherein in the configuration with a maximum inward concavity of the bottom wall, the peripheral portion runs alongside the tubular wall and the central portion faces the neck of the container to reduce an internal volume of the container.

15. The container according to claim 13, wherein the bottom wall includes at least one annular crease line configured for assisting the deformation of the bottom wall from the configuration with the minimum inward concavity to the configuration with the maximum inward concavity.

16. The container according to claim 15, wherein the at least one crease line is a spiral extending from the peripheral portion to the central portion.

17. The container according to claim 15, wherein the at least one crease line defines the deformation of the bottom wall.

18. The container according to claim 13, wherein in the configuration with the minimum inward concavity the bottom wall has a stepped shape increasing in size from the peripheral portion towards the central portion.

19. A table-top espresso machine, comprising:
a frame including a joining portion;
at least one reservoir for water associated with the frame;
at least one dispenser associated with the container for dispensing a beverage containing the water;
a heater located between the reservoir and the dispenser to raise a temperature of the water;
a mixing chamber operatively interposed between the heater and the dispenser;
a suction generator including a pump operatively interposed between the dispenser and the container;
wherein the reservoir is a container according to claim 1.

20. A container for food safe liquids for beverage dispensers, comprising:
a first end, or bottom wall;
a second end, or neck, equipped with an outlet portion for liquid configured to be connected to a corresponding joining portion of a beverage dispenser;
a tubular wall extending annularly along a central axis between the first and the second end;
wherein the tubular wall extends along the central axis with a succession of ridges and grooves shaped to make the tubular wall collapsible along the central axis to reduce overall dimensions of the container, to compensate for negative pressure generated inside the container during dispensing of the liquid and preventing contact between the liquid and air outside the container;
wherein the bottom wall comprises a central portion and a peripheral portion and is shaped such that, in a deformed configuration of the tubular wall, the central portion is proximal to the neck of the container relative to the peripheral portion;

wherein the bottom wall includes at least one annular crease line shaped as a spiral extending from the peripheral portion to the central portion and configured for assisting deformation of the bottom wall from a configuration with a minimum inward concavity to a configuration with a maximum inward concavity.

21. The container according to claim 20, wherein in the configuration with the minimum inward concavity, a distance between the central portion and the peripheral portion measured along the central axis is at a minimum, and in the configuration with the maximum inward concavity, the distance between the central portion and the peripheral portion is at a maximum.

22. The container according to claim 21, wherein in the configuration with the maximum inward concavity, the peripheral portion runs alongside the tubular wall and the central portion faces the neck of the container to reduce an internal volume of the container.

\* \* \* \* \*